(12) United States Patent
Ha

(10) Patent No.: US 6,843,224 B2
(45) Date of Patent: Jan. 18, 2005

(54) THROTTLE APPARATUS

(75) Inventor: Chang-Yoon Ha, Ansan (KR)

(73) Assignee: Hyundai Motor Company, Seoul (KR)

( * ) Notice: Subject to any disclaimer, the term of this patent is extended or adjusted under 35 U.S.C. 154(b) by 33 days.

(21) Appl. No.: 10/256,291

(22) Filed: Sep. 26, 2002

(65) Prior Publication Data

US 2003/0070654 A1 Apr. 17, 2003

(30) Foreign Application Priority Data

Oct. 12, 2001 (KR) .......................... 2001-62968

(51) Int. Cl.[7] .......................... F02M 35/10; F02M 35/12
(52) U.S. Cl. .................. 123/337; 123/339.23; 123/585; 123/590
(58) Field of Search ...................... 123/339.14, 339.23, 123/337, 585, 590; 181/229

(56) References Cited

U.S. PATENT DOCUMENTS

| 4,966,122 A | * | 10/1990 | Frinzel ..................... 123/339.1 |
| 5,947,082 A | * | 9/1999 | Choi et al. ............... 123/339.1 |
| 5,970,963 A | * | 10/1999 | Nakase et al. ............. 123/590 |
| 6,041,754 A | * | 3/2000 | Mori et al. ............. 123/339.23 |
| 6,196,187 B1 | * | 3/2001 | Zubeck et al. ........... 123/339.1 |
| 6,539,917 B2 | * | 4/2003 | Shaw et al. .............. 123/339.1 |

FOREIGN PATENT DOCUMENTS

JP 02-223662 * 9/1990 .................. 123/337

* cited by examiner

Primary Examiner—Tony M. Argenbright
(74) Attorney, Agent, or Firm—Morgan Lewis & Bockius LLP

(57) ABSTRACT

Air induction noise of a throttle apparatus caused by interference between flowing air and an opening for a bypass passage is reduced because a protrusion formed on an interior surface of the throttle apparatus changes aerodynamic features of the throttle apparatus.

4 Claims, 1 Drawing Sheet

THROTTLE APPARATUS

FIELD OF THE INVENTION

The present invention relates to a throttle apparatus for controlling the amount of air drawn into an engine.

BACKGROUND OF THE INVENTION

An engine is usually equipped with a throttle apparatus (which is commonly referred to as a "throttle body") for controlling the amount of air drawn into the engine. The typical throttle body includes a main passage equipped with a throttle valve for controlling the amount of air that flows through the throttle body. The throttle valve is closed at idling of an engine such that a minimal amount of air can be inducted into the engine.

In such an idle state of an engine, the amount of air inducted into the engine must be controlled in order to maintain a preferable idle state during changes in electrical and/or mechanical loads, such as operation of a compressor for air conditioning. Therefore, passage bypassing the throttle valve is provided and an idle speed actuator is installed in the bypass passage such that the amount of air bypassing the throttle valve can be controlled. An entrance and an exit of the bypass passage are located at either side of the throttle valve.

An actuator such as a levering apparatus actuates the throttle valve from outside of the throttle body. The bypass passage and the idle speed actuator are therefore also generally located at a position that does not produce interference with the actuator.

When the throttle valve is opened for acceleration, the air flowing through the narrow opening formed between the throttle valve and the interior wall of the main passage increases and passes the exit of the bypass passage at a high speed. Turbulence is generated by interference between the air-flow and the exit of the bypass passage. Consequently air-induction noise is produced at the exit and amplified by resonance in the bypass passage, which resultantly increases the total noise of the engine.

SUMMARY OF THE INVENTION

In a preferred embodiment of the present invention, a throttle body has a shaft therein and an opening formed at an interior surface thereof. A throttle plate rotates with the shaft. A bypass passage is connected to the opening and a protrusion is formed on the interior surface of the body between the shaft and the opening.

In a further preferred embodiment, the height of the protrusion increases as it goes from the shaft to the opening. More preferably, the width of the protrusion increases as it goes from the shaft to the opening. In another further embodiment, a surface of the protrusion is triangular.

Another preferred embodiment includes a throttle apparatus comprising a body that defines a main passage therethrough and a bypass passage adjacent to the main passage with entry and exit opening communicating between the main passage and bypass passage. A throttle plate is rotatably mounted in the main passage between the entry and exit openings. A protrusion is formed in a wall of the main passage between the throttle plate and exit opening. The protrusion increases in size along a direction moving from the throttle plate to the exit opening.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
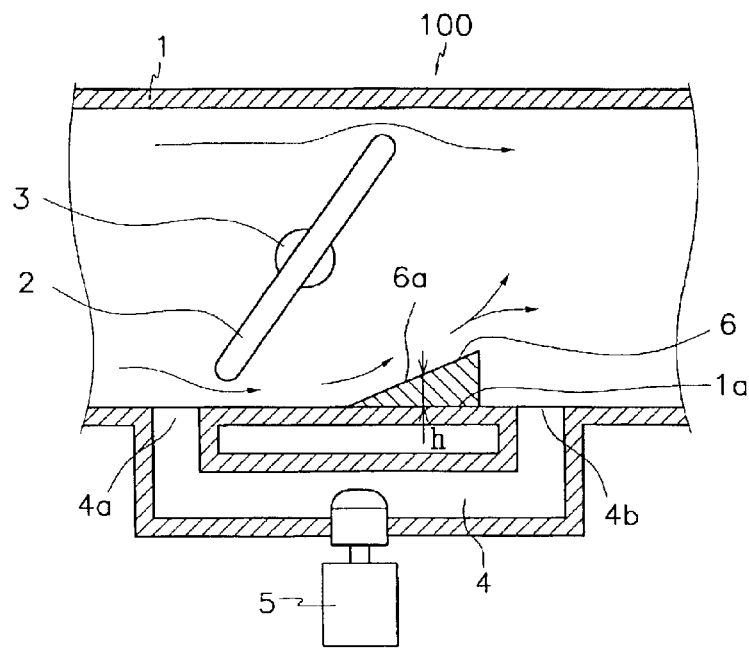
FIG. 1 is a cross-sectional view of a throttle apparatus according to a preferred embodiment of the present invention, the cross-section being taken along the central line thereof.

A preferred embodiment of the present invention will hereinafter be described in detail with reference to the accompanying drawings.

The throttle apparatus 100 guides air flow, for example, from an air induction pipe (not shown) to a surge tank (not shown). Air flow through the throttle apparatus 100 is shown by arrows in FIG. 1. Apparatus 100 includes an operating shaft 3 installed within a main passage defined by body 1. Openings 4a and 4b are respectively formed on an interior surface of the body 1, forward and rearward of the shaft 3. Openings 4a and 4b are connected by a bypass passage 4, and an idle speed actuator 5 is installed in the bypass passage 4, for the control of air passing therethrough. A throttle plate 2 is disposed on the shaft 3 such that the throttle plate 2 rotates with the shaft 3, for example, by an exteriorly disposed throttle actuator (not shown).

Figure 2:
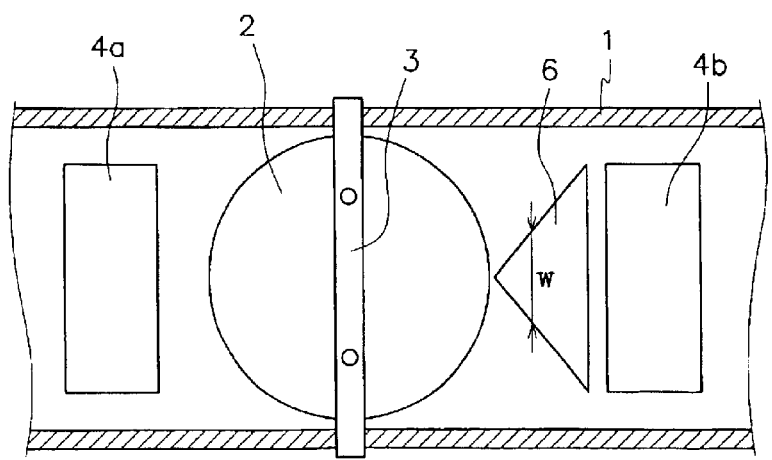
FIG. 2 is a cross-sectional view of a throttle apparatus according to a preferred embodiment of the present invention, the cross-section being taken perpendicularly to that of FIG. 1.

A protrusion 6 is formed on the interior surface of the body 1 at a position 1a between the shaft 3 and the opening 4b. As shown in FIG. 1, the height "h" of the protrusion 6 preferably increases from the shaft 3 to the opening 4b. As shown in FIG. 2, the width "w" of the protrusion 6 also preferably increases as it goes from the shaft 3 to the opening 4b. The surface 6a of the protrusion 6 is preferably triangular, as also shown in FIG. 2.

When the throttle plate 2 is operated from closed to opened, air induction noise is reduced according to the throttle apparatus 100 of the preferred embodiment, as follows. When the throttle plate 2 is opened, high speed air flow is formed between the throttle plate 2 and an interior surface of the body 1. However, this high speed air flows over the protrusion 6, and accordingly, direct interference between the flowing air and the opening 4b is prevented and turbulence energy is dispersed. Noise and side-effects of the protrusion 6 are minimized because the height and width become narrower as it goes closer to the shaft 3.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A throttle apparatus, comprising:

a body having a shaft therein and having an opening formed at an interior surface thereof;

a throttle plate rotating with the shaft;

a bypass passage connected to the opening; and a protrusion formed on the interior surface of the body between the shaft and the opening, wherein a width of the protrusion increases as it goes from the shaft to the opening.

2. The throttle apparatus of claim 1, wherein a height of the protrusion increases as it goes from the shaft to the opening.

3. The throttle apparatus of claim 1, wherein surface of the protrusion is triangular.

4. A throttle apparatus, comprising:

a body defining a main passage therethrough and a bypass passage adjacent said main passage with entry and exit opening communicating between the main passage and bypass passage;

a throttle plate rotatably mounted in the main passage between the entry and exit openings; and a protrusion formed in a wall of the main passage between the throttle plate and exit opening, wherein said protrusion increases in size along a direction moving from the throttle plate to the exit opening.

* * * * *